(12) United States Patent
Ogane et al.

(10) Patent No.: US 12,247,571 B2
(45) Date of Patent: Mar. 11, 2025

(54) MOTOR AND FAN DEVICE

(71) Applicant: MITSUBA Corporation, Gunma (JP)

(72) Inventors: Takahiko Ogane, Gunma (JP); Satoshi Takeda, Gunma (JP); Hirokazu Takada, Gunma (JP); Satoshi Nagamoto, Gunma (JP); Keiichi Hosoi, Gunma (JP)

(73) Assignee: MITSUBA Corporation, Gunma (JP)

( * ) Notice: Subject to any disclaimer, the term of this patent is extended or adjusted under 35 U.S.C. 154(b) by 274 days.

(21) Appl. No.: 18/164,569

(22) Filed: Feb. 4, 2023

(65) Prior Publication Data

US 2023/0296103 A1  Sep. 21, 2023

(30) Foreign Application Priority Data

Mar. 16, 2022 (JP) ................. 2022-041653

(51) Int. Cl.
| | |
|---|---|
| *H02K 7/14* | (2006.01) |
| *F04D 25/06* | (2006.01) |
| *H02K 11/33* | (2016.01) |
| *H02K 11/40* | (2016.01) |

(52) U.S. Cl.
CPC ........... *F04D 25/0693* (2013.01); *H02K 7/14* (2013.01); *H02K 11/33* (2016.01); *H02K 11/40* (2016.01)

(58) Field of Classification Search
CPC . B63B 19/08; B63B 2019/083; B63B 27/143; F04D 19/002; F04D 25/0633; F04D 25/0693; H02K 11/33; H02K 11/40; H02K 2211/03; H02K 5/225; H02K 7/14
See application file for complete search history.

(56) References Cited

U.S. PATENT DOCUMENTS

| | | | |
|---|---|---|---|
| 2004/0084980 A1* | 5/2004 | Yamaguchi | ............ H02K 7/063 310/81 |
| 2006/0028077 A1* | 2/2006 | Yamaguchi | ........ H02K 11/0141 310/81 |
| 2017/0008554 A1* | 1/2017 | Hirotani | ............... B62D 5/0406 |
| 2019/0186335 A1* | 6/2019 | Nishio | .................. F04D 29/329 |

FOREIGN PATENT DOCUMENTS

JP   2019108872   7/2019

* cited by examiner

*Primary Examiner* — Naishadh N Desai
(74) *Attorney, Agent, or Firm* — JCIPRNET

(57) ABSTRACT

A motor and a fan device are provided. The motor includes a motor bracket; a conductive shaft fixed to a front surface side of the motor bracket; a rotor rotatably supported on the shaft; a stator fixed to the front surface side of the motor bracket inside the rotor and wound with a plurality of coils for generating a magnetic field to rotate the rotor; a substrate, a front surface thereof mounted with a driver circuit for controlling magnetic field generation by the coils; and a driver case fixed to a rear surface side of the motor bracket and forming an accommodation space accommodating the substrate between itself and the motor bracket. A positive wiring of the driver circuit is mounted outside a region on the substrate overlapping the shaft when the motor is viewed from an axial direction of the shaft.

12 Claims, 7 Drawing Sheets

MOTOR AND FAN DEVICE

CROSS-REFERENCE TO RELATED APPLICATION

This application claims the priority benefits of Japanese application no. 2022-041653, filed on Mar. 16, 2022. The entity of the above-mentioned patent application is hereby incorporated by reference herein and made a part of this specification.

BACKGROUND

Technical Field

The disclosure relates to a motor and a fan device equipped with the motor.

Related Art

In recent years, efforts have been made to promote the Sustainable Development Goals (2030 Agenda for Sustainable Development, adopted at the United Nations Summit on Sep. 25, 2015, hereinafter referred to as "SDGs"). Along with this, techniques are known that aim to reduce waste and defective products in order to secure sustainable production and consumption patterns.

A so-called "electromechanical integrated" motor in which a driver circuit for driving the motor is integrated is known. In an electromechanical integrated motor, for example, a shaft, a rotor, and a stator are generally disposed on a front surface side of a motor bracket, and a substrate on which a driver circuit is mounted is disposed on a rear surface side of the motor bracket. Further, such a motor is equipped in an engine room of a vehicle, for example, as a motor that drives a cooling fan that supplies cooling air to a radiator (see Patent Literature 1: JP 2019-108872 A, for example).

In such an electromechanical integrated motor, if the shaft breaks through the motor bracket and contacts the substrate in the case of a vehicle collision, there is a problem that the driver circuit is short-circuited and an overcurrent flows.

The disclosure provides a technique for preventing an overcurrent from flowing even when a shaft contacts a substrate in an electromechanical integrated motor having a driver circuit integrated therein.

SUMMARY

The disclosure provides: a motor, including: a motor bracket; a conductive shaft fixed to a front surface side of the motor bracket; a rotor rotatably supported on the shaft; a stator fixed to the front surface side of the motor bracket inside the rotor and wound with a plurality of coils for generating a magnetic field to rotate the rotor; a substrate, a front surface thereof mounted which a driver circuit for controlling magnetic field generation by the coils; and a driver case fixed to a rear surface side of the motor bracket and forming an accommodation space accommodating the substrate between itself and the motor bracket. A positive wiring of the driver circuit is mounted outside a region on the substrate overlapping the shaft when the motor is viewed from an axial direction of the shaft.

DESCRIPTION OF THE EMBODIMENTS

According to the disclosure, it is possible to prevent an overcurrent from flowing even when a shaft contacts a substrate in an electromechanical integrated motor having a driver circuit integrated therein. Problems, configurations, and effects other than those described above will be explained by the following description of the embodiments.

As one aspect of a fan device according to an embodiment of the disclosure, a fan device that is equipped in a vehicle such as an automobile and cools engine cooling water or the like flowing in a radiator will be described below.

(Overall Configuration of Fan Device 1)

Figure 1:
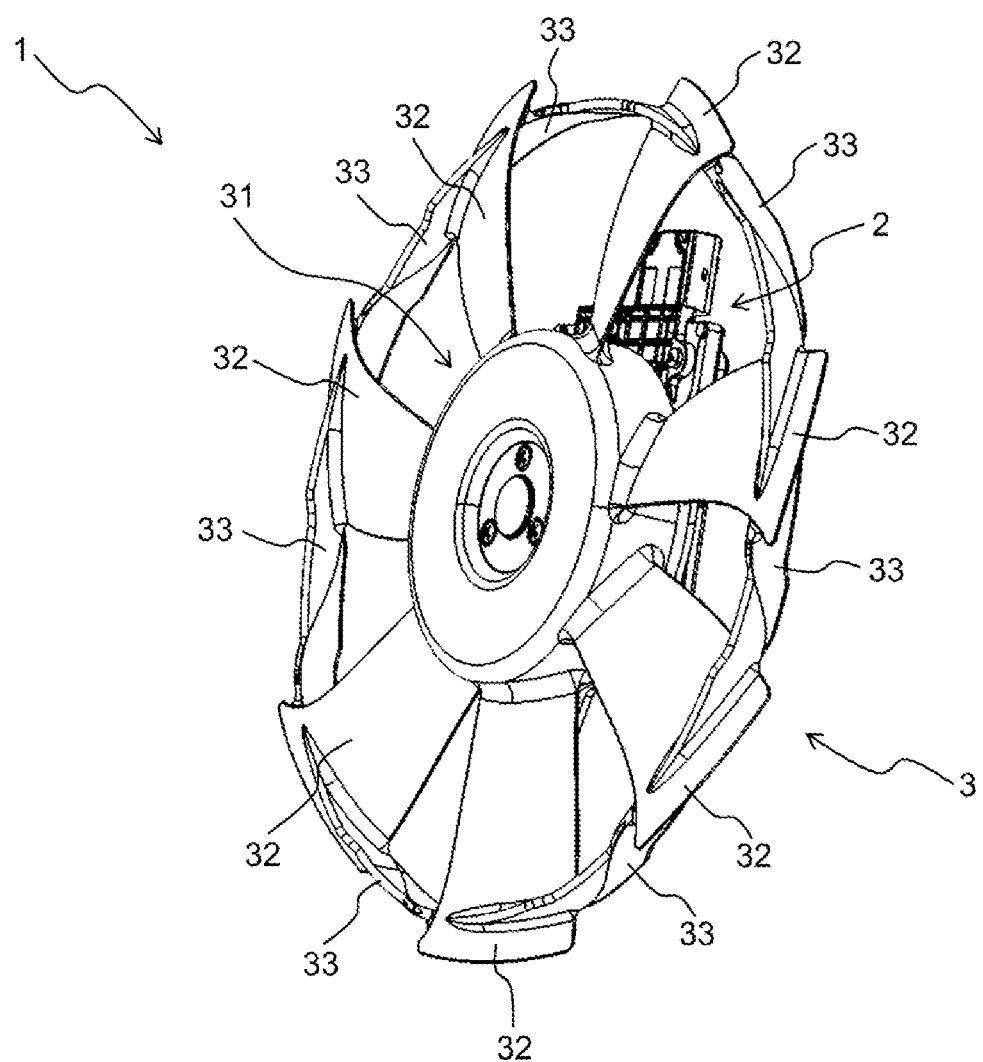
FIG. 1 is an external perspective diagram showing a configuration example of a fan device according to an embodiment.
Figure 2:
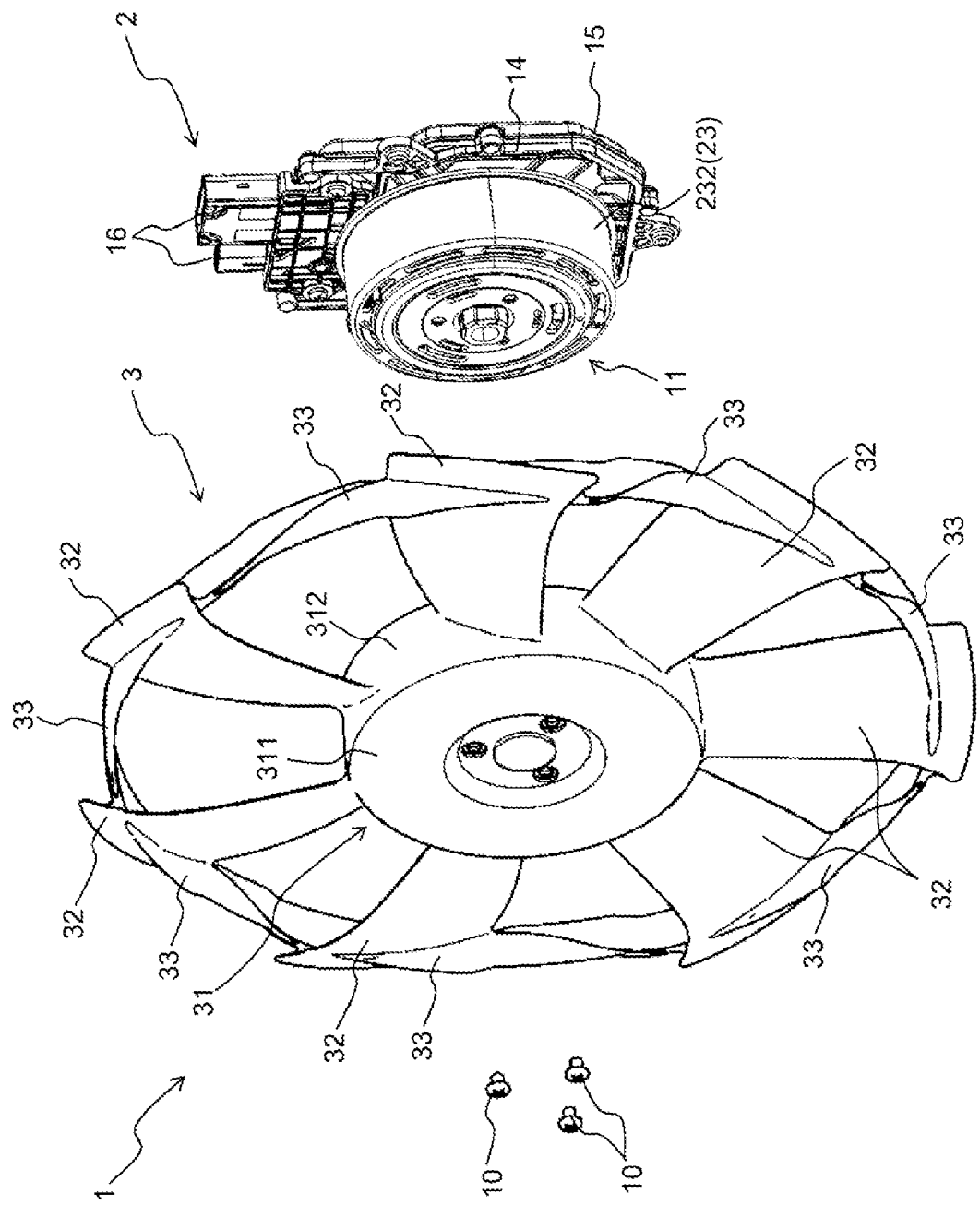
FIG. 2 is an exploded perspective diagram of a motor and a fan.

First, an overall configuration of a fan device 1 will be described with reference to FIGS. 1 and 2. FIG. 1 is an external perspective diagram showing a configuration example of the fan device 1 according to an embodiment. FIG. 2 is an exploded perspective diagram of a motor 2 and a fan 3.

As shown in FIGS. 1 and 2, the fan device 1 includes the motor 2 which is a drive source, and the fan 3 which is rotationally driven by the motor 2 to generate cooling air. The fan device 1 is installed in an engine room, for example, such that the motor 2 is disposed on a rear side (the side facing an engine) and the fan 3 is disposed on a front side (the side facing a radiator).

The fan 3 is fastened to the motor 2 by a plurality of screws 10. The screws are fastened to a rotor yoke 232 of the motor 2 from a front side of the fan 3 (a side opposite to a side facing the motor 2) through screw holes formed in a boss portion 31 serving as a central portion of the fan 3. It is not always necessary to use the screws 10 as fastening members for fastening the fan 3 to the motor 2. As long as the fan 3 may be fastened to the motor 2, the number of screws and the types of fastening members are not particularly limited.

The fan 3 includes the boss portion 31 that rotates integrally with a rotor 23 around an axial center of a shaft 21, a plurality of (seven in this embodiment) blades 32 that project radially from an outer circumference of the boss portion 31; and a plurality of (seven in this embodiment) connecting members 33 that connect the adjacent blades 32 on a tip side.

The boss portion 31 includes a disk-shaped disk portion 311 and a cylindrical peripheral wall portion 312 protruding from an outer edge of the disk portion 311 toward the motor 2 and having the plurality of blades 32 attached thereto. When the fan 3 is attached to the motor 2, the disk portion 311 faces a connection wall 232C of the rotor yoke 232 and the peripheral wall portion 312 surrounds the outer circumferential wall 232A of the rotor yoke 232.

(Configuration of Motor 2)

Figure 3:
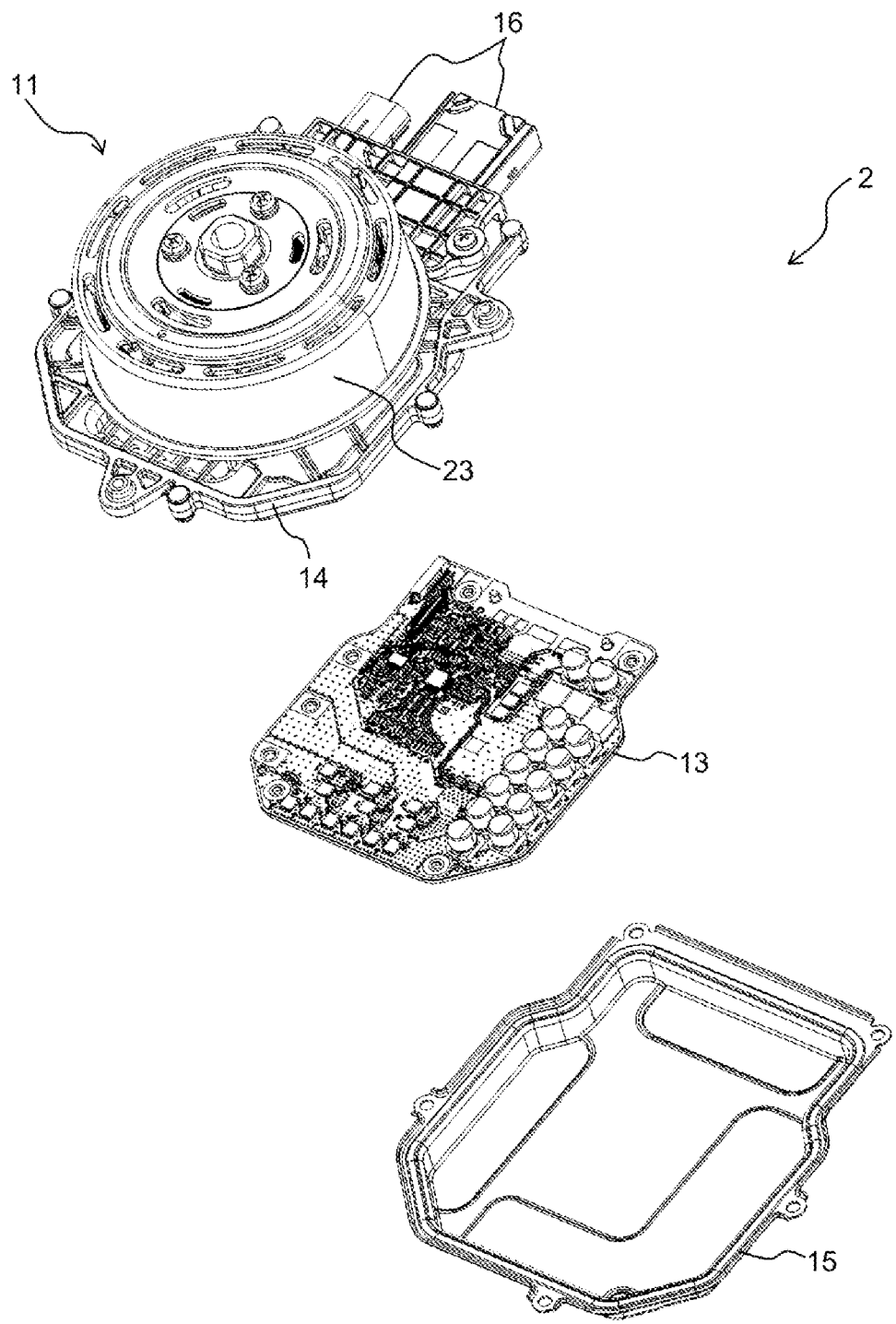
FIG. 3 is an exploded perspective diagram of a brushless motor, a substrate, and a driver case.
Figure 4:
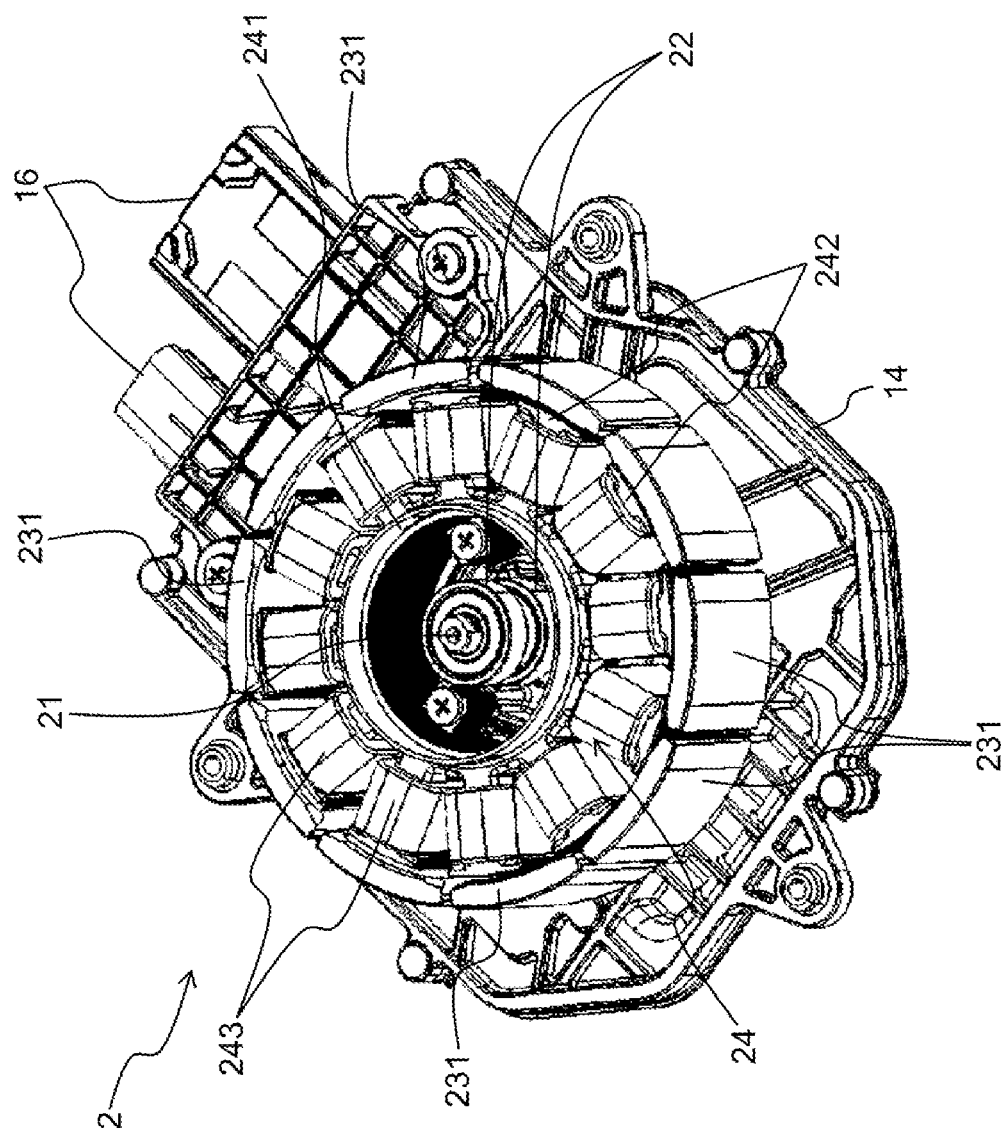
FIG. 4 is a perspective diagram showing a front surface side of a configuration of a motor with a rotor yoke removed.
Figure 5:
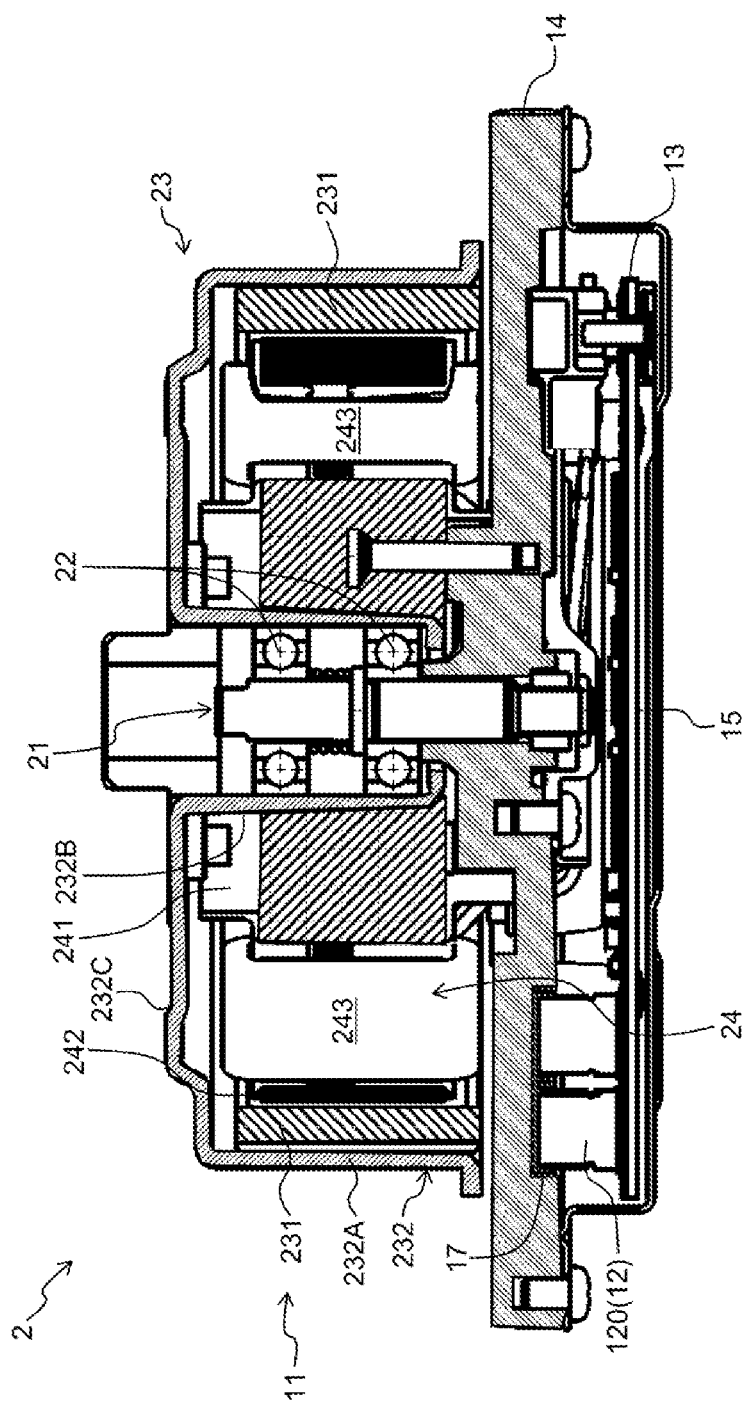
FIG. 5 is a longitudinal sectional diagram of a motor.

Next, the configuration of the motor 2 will be described with reference to FIGS. 3 to 5. FIG. 3 is an exploded perspective diagram of a brushless motor 11, a substrate 13, and a driver case 15. FIG. 4 is a perspective diagram showing a front surface side of a configuration of the motor 2 with the rotor yoke 232 removed. FIG. 5 is a longitudinal sectional diagram of the motor 2.

As shown in FIGS. 3 to 5, the motor 2 is a so-called "electromechanical integrated" electric motor including an outer rotor type brushless motor 11 and a substrate 13 on which a driver circuit 12 is mounted.

The brushless motor 11 is supported by a motor bracket 14. The brushless motor 11 is disposed on one side (front surface side) of the motor bracket 14 in a thickness direction. A driver case 15 is fastened to the other side (rear surface side) of the motor bracket 14 in the thickness direction by a plurality of screws. Thereby, an accommodation space for accommodating the substrate 13 is formed between a rear surface of the motor bracket 14 and the driver case 15.

In other words, the substrate 13 is disposed on a side opposite to components 21-24 of the brushless motor 11 (the rear surface side of the motor bracket 14) with the motor bracket 14 interposed therebetween. The motor bracket 14 and the driver case 15 are made of a material having high thermal conductivity (for example, a metal such as aluminum, iron, or stainless steel). Also, the motor bracket 14 and the driver case 15 may be black in order to increase heat absorption rate.

A connector unit 16 in which two connectors to which an external harness is connected are integrated is attached to an end portion of the motor bracket 14. The brushless motor 11, the driver circuit 12, and the connector unit 16 are electrically connected.

As shown in FIGS. 3-5, the brushless motor 11 includes the shaft 21; a plurality of bearings 22 provided on an outer circumference of the shaft 21; the rotor 23 rotatably supported around the axial center of the shaft 21 via the bearings 22; and an annular stator 24 fixed at a predetermined interval from the rotor 23 in a radial direction.

The shaft 21 is a fixed shaft fixed to the front surface side of the motor bracket 14. In the following description of components of the motor 2, an axial direction of the shaft 21 is simply referred to as the "axial direction", the radial direction around the axial center of the shaft 21 is simply referred to as the "radial direction", and a circumferential direction around the axial center of the shaft 21 is simply referred to as the "circumferential direction".

The rotor 23 includes a plurality of permanent magnets 231 disposed at equal intervals in the circumferential direction so as to surround an outer circumference of the stator 24, and the rotor yoke 232 that supports the plurality of permanent magnets 231 and is rotatably supported on the shaft 21.

The rotor yoke 232 is disposed on the front surface side of the motor bracket 14 so as to be concentric with the axial center of the shaft 21. Moreover, the rotor yoke 232 is rotatably supported by the shaft 21 via the plurality of bearings 22. Furthermore, the rotor yoke 232 includes an outer circumferential wall 232A, an inner circumferential wall 232B, and the connection wall 232C.

The outer circumferential wall 232A has a cylindrical outer shape. Moreover, the outer circumferential wall 232A is disposed outward of the stator 24 in the radial direction. Further, the outer circumferential wall 232A supports the plurality of permanent magnets 231 with an inner circumferential surface. In other words, the plurality of permanent magnets 231 are fixed to an inner circumferential surface of the outer circumferential wall 232A at predetermined intervals in the circumferential direction.

The inner circumferential wall 232B has a cylindrical outer shape. Moreover, the inner circumferential wall 232B is disposed inward of the stator 24 in the radial direction. Further, the inner circumferential wall 232B is rotatably supported by the shaft 21 via the plurality of bearings 22.

The connection wall 232C has a disk-shaped outer shape. Moreover, the connection wall 232C connects axial ends of the outer circumferential wall 232A and the inner circumferential wall 232B. Furthermore, the connection wall 232C is disposed on a side opposite to the motor bracket 14 with the stator 24 interposed therebetween. The connection wall 232C is disposed opposite to the stator 24 with a predetermined interval in the axial direction.

The stator 24 is accommodated in a space surrounded by the outer circumferential wall 232A, the inner circumferential wall 232B, the connection wall 232C, and a front surface of the motor bracket 14. Moreover, the stator 24 is fixed to the front surface side of the motor bracket 14 inward of the plurality of permanent magnets 231 in the radial direction. Furthermore, the stator 24 faces the plurality of permanent magnets 231 with a predetermined gap in the radial direction.

The stator 24 includes a cylindrical stator core 241, a stator insulator 242 mounted on both sides in the axial direction of a plurality of teeth projecting outward in the radial direction from the stator core 241; and conductive coils 243 wound on the stator insulator 242.

The stator 24 generates a magnetic field when a current flows through the coils 243. The rotor yoke 232 rotates around the axial center of the shaft 21 due to the magnetic field generated by the coils 243 and the attractive force and repulsive force generated between the plurality of permanent magnets 231.

Moreover, the motor 2 is disposed in the engine room with the shaft 21 directed in a traveling direction of a vehicle. The motor 2 is disposed in the engine room with the brushless motor 11 facing forward and the driver case 15 facing rearward.

(Configuration of Driver Circuit 12)

Figure 6:
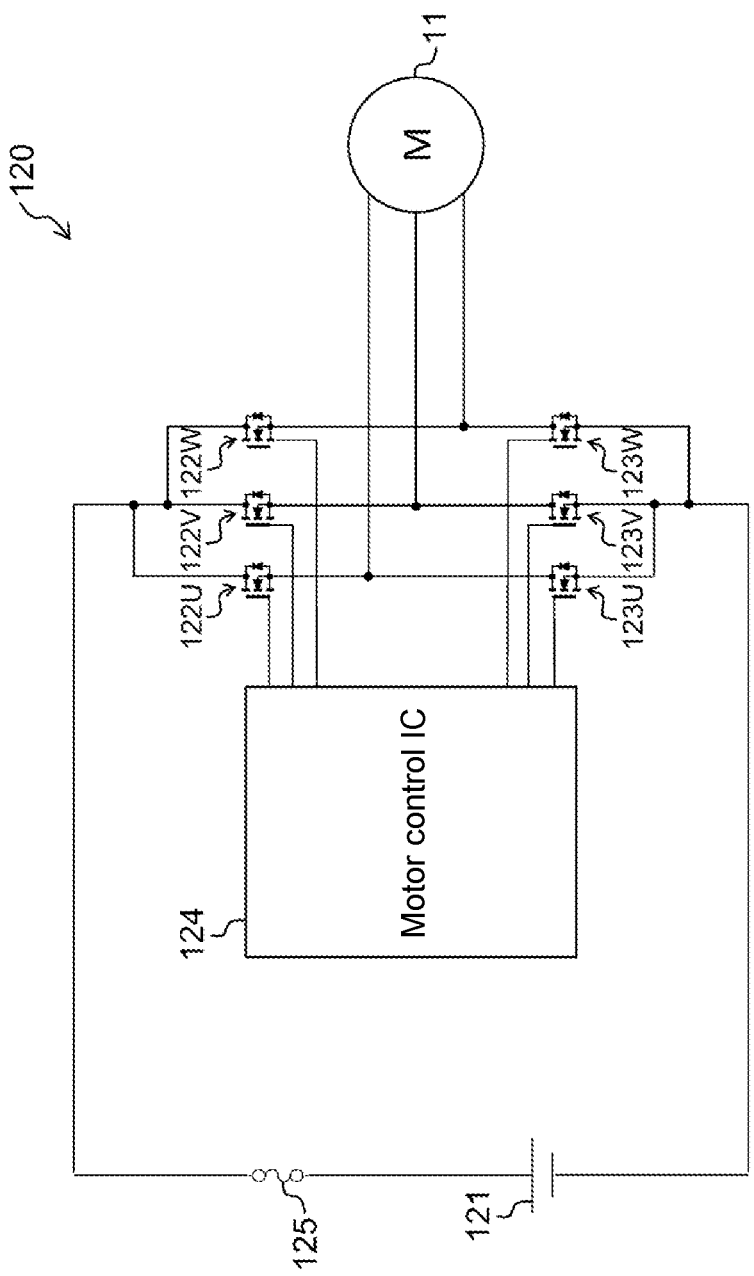
FIG. 6 is a schematic circuit diagram of a power system circuit included in a driver circuit.
Figure 7:
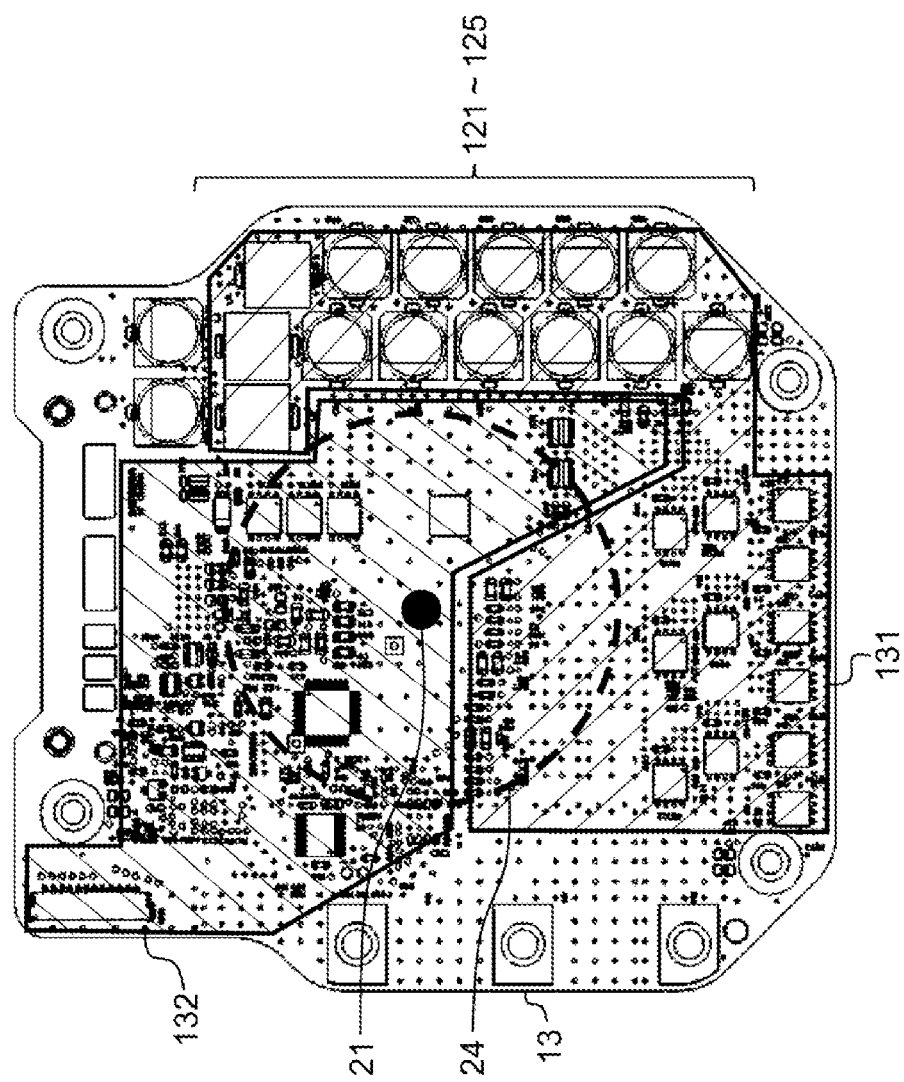
FIG. 7 is a plan diagram of a substrate on which a driver circuit is mounted.

FIG. 6 is a schematic circuit diagram of a power system circuit 120 included in the driver circuit 12. FIG. 7 is a plan diagram of the substrate 13 on which the driver circuit 12 is mounted. The driver circuit 12 controls generation of the magnetic field by the plurality of coils 243. The driver circuit 12 is composed of a plurality of electronic components (e.g. transistor, diode, resistor, etc.) surface-mounted on a front surface of the substrate 13 facing the motor bracket 14. The substrate 13 has a plate-like shape made of, for example, an aluminum alloy.

As shown in FIG. 6, to supply current from a power source 121 to the coils 243 of the brushless motor 11, the power system circuit 120 mainly includes three positive side transistors: 122U, 122V 122W; three negative side transistors: 123U, 123V, 123W; a motor control IC 124; and a fuse 125 (hereinafter, they may be referred to collectively as "power system components 121-125"). Moreover, the electronic components that supply current to the coils 243 are not limited to the power system components 121-125 described above.

Sources of the positive side transistors 122U, 122V, 122W are connected in parallel to a positive pole of the power source 121. Drains of the positive side transistors 122U, 122V, 122W are connected to the coils 243 of the U phase, V phase, and W phase, respectively. Furthermore, gates of the positive side transistors 122U, 122V, 122W are connected to the motor control IC 124.

Sources of the negative side transistors 123U, 123V, 123W are connected to the coils 243 of the U phase, V phase and W phase, respectively. Moreover, drains of the negative side transistors 123U, 123V, 123W are connected in parallel to a negative pole of the power source 121. Furthermore, gates of the negative side transistors 123U, 123V, 123W are connected to the motor control IC 124.

In other words, a wiring from the positive pole of the power source 121 to the coils 243 via the positive side transistors 122U, 122V, 122W is a positive wiring having a positive potential. Also, a wiring from the coils 243 to the negative pole of the power source 121 via the negative side transistors 123U, 123V, 123W is a GND wiring having a ground potential.

The motor control IC 124 controls ON and OFF of the transistors 122U, 122V, 122W, 123U, 123V, 123W (supply and cutoff of current to the coils 243) by controlling the application of voltage to the gate of each transistor 122U, 122V, 122W, 123U, 123V, 123W. The fuse 125 is disposed between the positive pole of the power source 121 and the positive side transistors 122U, 122V, 122W, and cuts off the wiring when an overcurrent flows through the power system circuit 120.

As shown in FIG. 7, the front surface of the substrate 13 includes regions 131 and 132. Among the wirings forming the driver circuit 12, the positive wiring and the power system components 121-125 are disposed in the region 131, and the GND wiring is disposed in the region 132. Moreover, the positive wiring and GND wiring described here include not only the wiring of the power system circuit 120 described with reference to FIG. 6, but also the wiring of a control system (e.g. speed controller, speed converter, voltage controller, etc.)

A mark • in FIG. 7 indicates a position on the substrate 13 overlapping the shaft 21 when the motor 2 is viewed from the axial direction of the shaft 21 (in other words, a position where the shaft 21 is extended in the axial direction). As shown in FIG. 7, an extension of the shaft 21 overlaps the region 132. That is, the GND wiring of the driver circuit 12 is mounted on the region 132 on the substrate 13 overlapping the shaft 21 when the motor 2 is viewed from the axial direction of the shaft 21. In other words, the positive wiring and the electronic components of the driver circuit 12 are mounted outside a region on the substrate 13 overlapping the shaft 21 when the motor 2 is viewed from the axial direction of the shaft 21.

A dashed line in FIG. 7 indicates a position overlapping the outer circumference of the stator 24 when the motor 2 is viewed from the axial direction of the shaft 21. The power system components 121-125 are mounted outside a region on the substrate 13 overlapping the stator 24.

Furthermore, as shown in FIG. 5, the power system components 121-125 are in contact with the metal motor bracket 14 via an adhesive 17. It is desirable that the adhesive 17 has high thermal conductivity.

According to the above embodiment, for example, the following operational effects are obtained.

According to the above embodiment, the GND wiring of the driver circuit 12 is mounted on the region on the substrate 13 overlapping the shaft 21 when the motor 2 is viewed from the axial direction of the shaft 21. Thereby, even if the shaft 21 passes through the motor bracket 14 and contacts the substrate 13, only the shaft 21 and the GND wiring having the same potential come into contact with each other, thus overcurrent does not flow throughout the driver circuit 12. As a result, it is possible to prevent blowing of the fuse 125.

In order to prevent overcurrent from flowing through the driver circuit 12, it is only necessary to avoid the shaft 21 passing through the motor bracket 14 from coming into contact with the portion of the driver circuit 12 having positive potential. In other words, it is only necessary that the portion of the driver circuit 12 having positive potential (typically, the positive wiring) is mounted outside the region on the substrate 13 overlapping the shaft 21 when the motor 2 is viewed from the axial direction of the shaft 21. Here, the region on the substrate 13 overlapping the shaft 21 may be left unmounted when the motor 2 is viewed from the axial direction of the shaft 21, although from the viewpoint of improving the residual copper rate, the GND wiring is preferably mounted.

Further, according to the above embodiment, the power system components 121-125 are mounted outside the region on the substrate 13 overlapping the stator 24 when the motor 2 is viewed from the axial direction of the shaft 21. In this way, by keeping the power system components 121-125 that generate heat by themselves away from the coils 243, the thermal influence on the coils 243 can be reduced. Further, since the power system components 121-125 may be kept away from the shaft 21, the influence of heat received from the shaft 21 on the power system components 121-125 can be reduced. Thereby, the life of the motor 2 is extended, contributing to the waste reduction.

Furthermore, according to the above embodiment, since the power system components 121-125 are brought into contact with the metal motor bracket 14 via the adhesive 17, heat radiation effect is improved. In particular, when the fan 3 is driven by the motor 2, since the motor bracket 14 is cooled by the cooling air generated by the fan 3, the heat dissipation effect is further improved. Thereby, the life of the motor 2 is extended, contributing to the waste reduction.

In the above embodiment, an example in which the fan device 1 is equipped in a vehicle driven by an engine has been described, but the fan device 1 may be equipped in a vehicle driven by a motor, storage battery, fuel cell, or the like. Also, as an application of the fan device 1, an example of supplying cooling air to a radiator has been described, but the application of the fan device 1 is not limited thereto. Furthermore, in the embodiment, as an application of the motor 2, an example of a fan motor that rotationally drives the fan 3 has been described, but the application of the motor 2 is not limited thereto. Moreover, an example in which the substrate made of aluminum alloy is applied has been described, but the substrate 13 may be a substrate made of resin such as glass epoxy resin.

The embodiment of the disclosure has been described above. Moreover, the disclosure is not limited to the above embodiment, and includes various modifications. For example, the above embodiment has been described in detail in order to explain the disclosure in an easy-to-understand manner, and is not necessarily limited to having all the configurations described. Further, a part of the configuration of this embodiment may be replaced with the configuration of another embodiment, and it is also possible to add the configuration of another embodiment to the configuration of this embodiment. Furthermore, it is possible to add, delete, or replace a part of the configuration of this embodiment with another configuration.

What is claimed is:
1. A motor, comprising:
a motor bracket;
a conductive shaft fixed to a front surface side of the motor bracket;
a rotor rotatably supported on the shaft;

a stator fixed to the front surface side of the motor bracket inside the rotor and wound with a plurality of coils for generating a magnetic field to rotate the rotor;

a substrate, a front surface thereof mounted which a driver circuit for controlling magnetic field generation by the coils;

a driver case fixed to a rear surface side of the motor bracket and forming an accommodation space accommodating the substrate between itself and the motor bracket, wherein a positive wiring of the driver circuit is mounted outside a region on the substrate overlapping the shaft when the motor is viewed from an axial direction of the shaft.

2. The motor according to claim 1, wherein a GND wiring of the driver circuit is mounted on the region on the substrate overlapping the shaft when the motor is viewed from the axial direction of the shaft.

3. The motor according to claim 1, wherein a power system component of the driver current that supplies current to the coils is mounted outside a region on the substrate overlapping the stator when the motor is viewed from the axial direction of the shaft.

4. The motor according to claim 2, wherein a power system component of the driver current that supplies current to the coils is mounted outside a region on the substrate overlapping the stator when the motor is viewed from the axial direction of the shaft.

5. The motor according to claim 3, wherein the power system component is in contact with the motor bracket made of metal via an adhesive.

6. The motor according to claim 4, wherein the power system component is in contact with the motor bracket made of metal via an adhesive.

7. A fan device, comprising:

the motor according to claim 1; and a fan rotationally driven by the motor to generate cooling air.

8. A fan device, comprising:

the motor according to claim 2; and a fan rotationally driven by the motor to generate cooling air.

9. A fan device, comprising:

the motor according to claim 3; and a fan rotationally driven by the motor to generate cooling air.

10. A fan device, comprising:

the motor according to claim 4; and a fan rotationally driven by the motor to generate cooling air.

11. A fan device, comprising:

the motor according to claim 5; and a fan rotationally driven by the motor to generate cooling air.

12. A fan device, comprising:

the motor according to claim 6; and a fan rotationally driven by the motor to generate cooling air.

* * * * *